[11] 3,597,047

| [72] | Inventor | Robert L. Carbrey<br>Colts Neck, N.J. |
|---|---|---|
| [21] | Appl. No. | 833,115 |
| [22] | Filed | June 13, 1969 |
| [45] | Patented | Aug. 3, 1971 |
| [73] | Assignee | Bell Telephone Laboratories, Incorporated<br>Murray Hill, N.J. |

[54] LIGHT BEAM DEFLECTION APPARATUS HAVING ENHANCED DEFLECTION BY MULTIPLE REFLECTION
12 Claims, 5 Drawing Figs.

[52] U.S. Cl.............................................. 350/150,
250/199, 350/157
[51] Int. Cl.............................................. G02f 1/26
[50] Field of Search........................................ 350/150,
160, 285; 250/199

[56] References Cited
UNITED STATES PATENTS
3,503,669   3/1970   Zook......,.....................   350/150

*Primary Examiner*—David Schonberg
*Assistant Examiner*—Paul R. Miller
*Attorneys*—R. J. Guenther and Kenneth B. Hamlin ABSTRACT: The incremental index of refraction change due to the properties of electrooptic material is enhanced by providing multiple reflection of a light beam between mirrors disposed on opposite sides of the electrooptic material, particularly if one of the mirrors is concave and the other convex. A light beam deflector of this construction is disclosed in an analog-to-digital coder and is also well adapted for use in time-division multiplex systems.

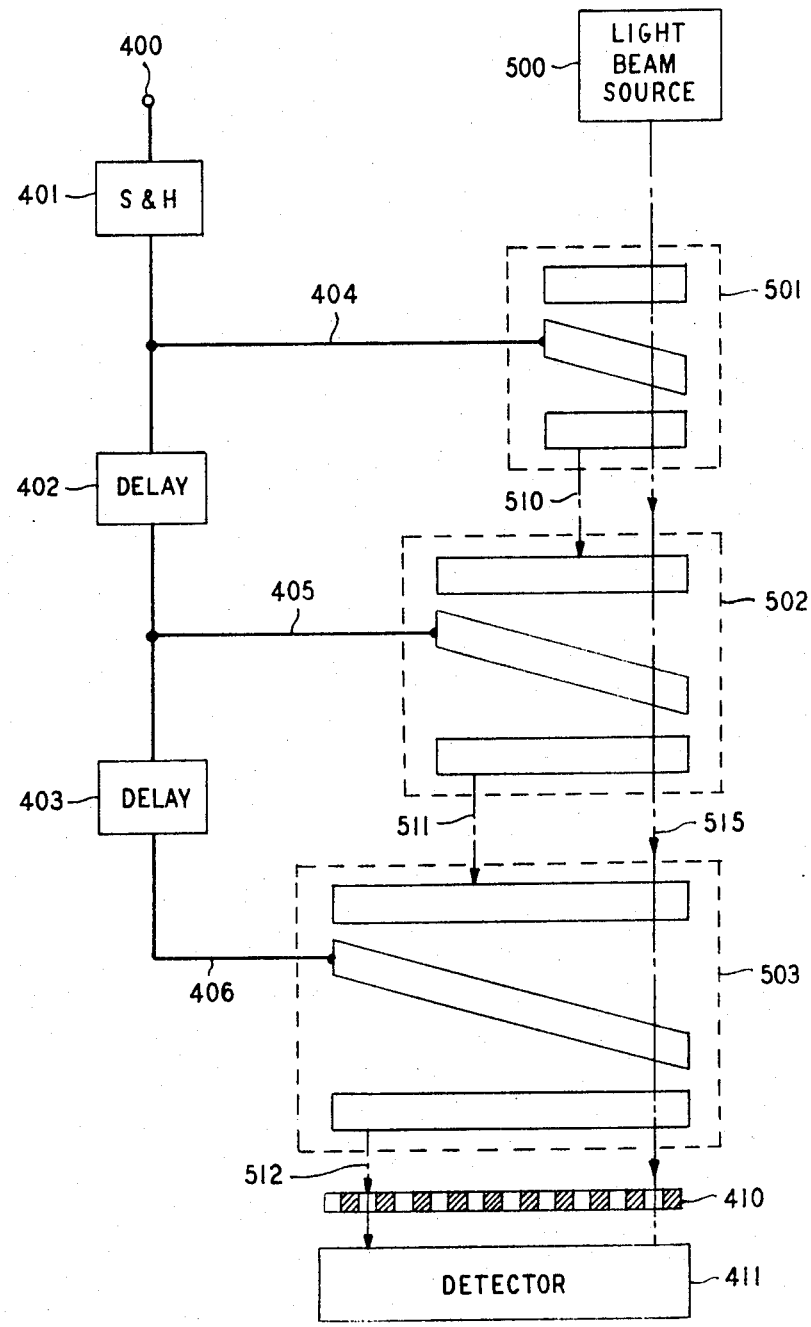

3,597,047

LIGHT BEAM DEFLECTION APPARATUS HAVING ENHANCED DEFLECTION BY MULTIPLE REFLECTION

BACKGROUND OF THE INVENTION

1. Field of the Invention

This invention relates to light beam deflection and modulation apparatus and, more specifically, to light beam coders and multiplexing devices.

2. Description of the Prior Art

The development of modern communication systems has indicated the need for signal translating apparatus which can operate at extremely high speeds. For example, in systems using pulse code modulation it is necessary to translate an analog signal into digital form at very high frequencies. Similarly, multiplexing systems require rapid separation of a single signal into a plurality of signals for transmission over respective communication channels. At the operative frequencies of such systems the utility of electronic components such as transistors may be reduced as a result of limitations in their high-speed switching capabilities. It has been necessary, therefore, to search for other means of translating signals from one form to another at extremely high frequencies.

It has recently become apparent that the controlled deflection of light beams through an electro-optic medium subject to an electric field may provide a useful means of translating signals at extremely high rates. Indeed, variations in the deflection of light beams passing through an electro-optic material occur extremely rapidly in response to fluctuations of an input signal applied to the material. Development of the use of light beams in this manner has been retarded, however, because the variation in the angle of deflection which can normally be obtained by imposing an electric field upon an electro-optic material is extremely small.

SUMMARY OF THE INVENTION

Accordingly, it is an object of this invention to provide apparatus for multiplying the deflection of a light beam in an electro-optic material in response to an input signal.

It is another object of this invention to provide a high-speed analog-to-digital coder which utilizes the deflection of a light beam through an electro-optic material.

It is another object of this invention to provide a multiplexing apparatus using the deflection of a light beam through an electro-optic material.

These and other objects are attained in a light beam deflection apparatus which comprises an electro-optic material, illustratively a crystal, which is positioned between two facing reflectors, illustratively mirrors. In one embodiment of an analog-to-digital coder in accordance with this invention, the analog input signal is applied to circuitry which provides an electric field in an electro-optic crystal. A light beam is directed through a hole or transparency in one of the mirrors and strikes the crystal at a slightly oblique angle. The beam is refracted through the crystal at an angle which depends on the strength of the electric field and is reflected off the opposite mirror. Then, by means of return mirrors, the beam is reflected around the crystal and returned to the first mirror, where it is reflected such that it traverses the crystal again. This process is repeated for a predetermined number of traverses through the crystal. With each traverse of the crystal the beam is refracted through an incremental angle and is displaced longitudinally along the crystal. As the strength of the electric field imposed on the crystal is varied, the incremental refraction angle varies accordingly. Thus the variation in the longitudinal displacement of the light beam is multiplied.

In one illustrative coder embodiment in accordance with this invention planar mirrors are used to reflect the beam repeatedly through the crystal. However, to maximize the controllable variation in the position and direction of the light beam, another illustrative embodiment utilizes a concave mirror and a convex mirror to form a curved "mirror corridor" into which the electro-optic crystal is placed.

To utilize the light beam for coding purposes, apparatus is provided for directing the beam through a coding mask to detection circuitry after a predetermined period of time or after a predetermined number of passes through the crystal. This is accomplished in one illustrative embodiment by using a "walk-off gate." For this purpose, one of the mirrors is tilted slightly to deflect the light beam incrementally at right angles to the direction of refraction. Accordingly, after a predetermined number of reflections between the mirrors, that is, after a predetermined number of passes through the electro-optic material, the light beam "walks off" one of the mirrors and is directed toward the coding mask and output circuitry.

Higher input signal frequencies are accommodated advantageously by cascading a number of electro-optic crystals and applying the input signal to successive crystals through a series of delay lines.

Moreover, light beam deflection apparatus according to my invention may be employed advantageously for multiplexing purposes, deflecting a light beam through a series of discrete angles, each angle illustratively corresponding to a different communication channel.

BRIEF DESCRIPTION OF THE DRAWING

The above and other objects and features of the invention may become more fully apparent by consideration of the following detailed description and the accompanying drawing, in which:

FIG. 5 shows an illustrative embodiment of a cascaded light beam coder constructed in accordance with the invention.

DETAILED DESCRIPTION

Figure 1:
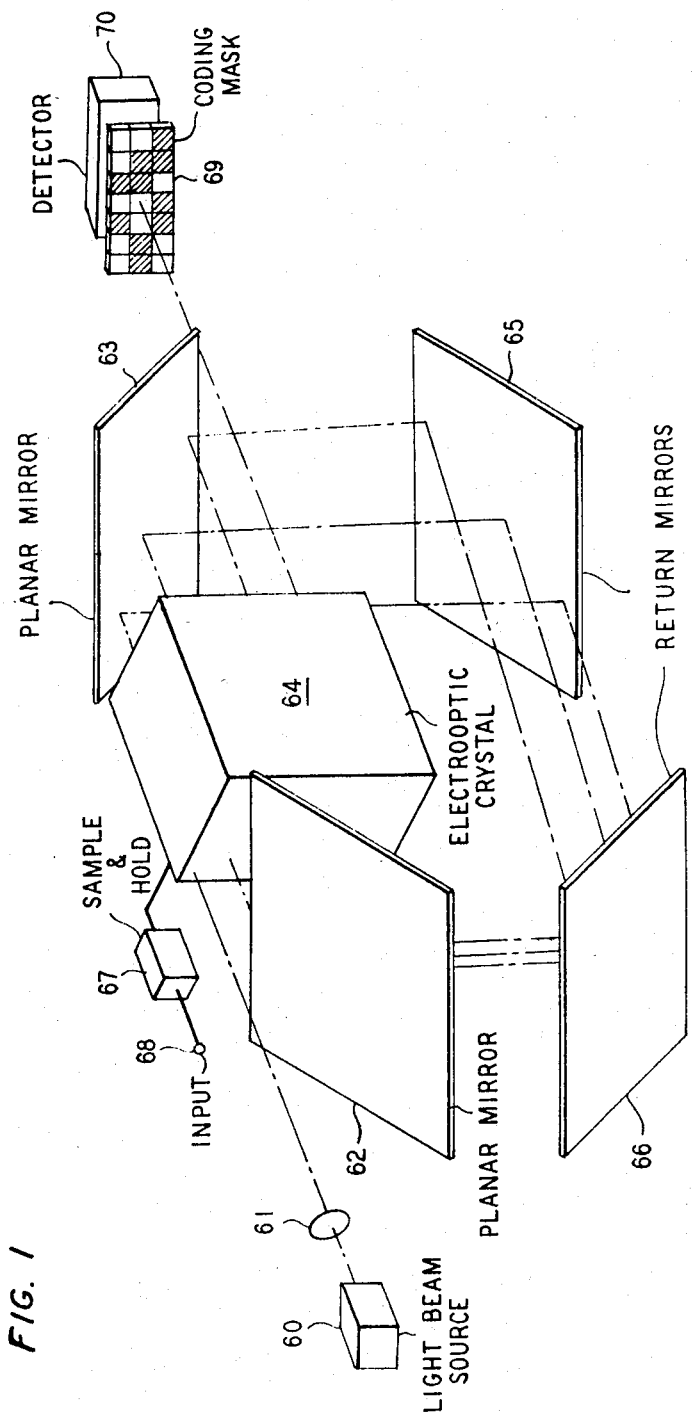
FIG. 1 is a pictorial view of an illustrative embodiment of a light beam coder using planar mirrors constructed in accordance with the principles of the invention.

A pictorial view of an illustrative light beam analog-to-digital coder having planar reflectors or mirrors 62 and 63 and return mirrors 65 and 66 is shown in FIG. 1. Electro-optic crystal material 64, illustratively a KDP (potassium dihyrogen phosphate) crystal, is positioned between planar mirrors 62 and 63, and light beam source 60 directs a beam of light, preferably coherent, through focusing lens 61 over the upper edge of planar mirror 62 to the left face of electro-optic crystal 64. The light beam is refracted by electro-optic crystal 64 through an incremental angle controlled by the magnitude of the analog input signal at terminal 68, which is connected to electro-optic crystal 64 through sample and hold circuit 67. After passing through electro-optic crystal 64 the light beam is reflected by mirror 63 over a return path around crystal 64 to mirror 62, the return path illustratively comprising return mirrors 65 and 66.

The beam of light is reflected repeatedly over this general path through crystal 64 by mirrors 62, 63, 65 and 66 in a manner described in detail below. After a predetermined number of passes or incremental refractions through crystal 64, the light beam is directed such that it passes below the lower edge of planar mirror 62 to coding mask 69, the exact position at which it strikes the coding mask 69 depending upon the magnitude of the analog input signal at terminal 68. Detector circuit 70, disposed behind coding mask 69, converts the position of the light beam into a corresponding digital representation.

Figure 2:
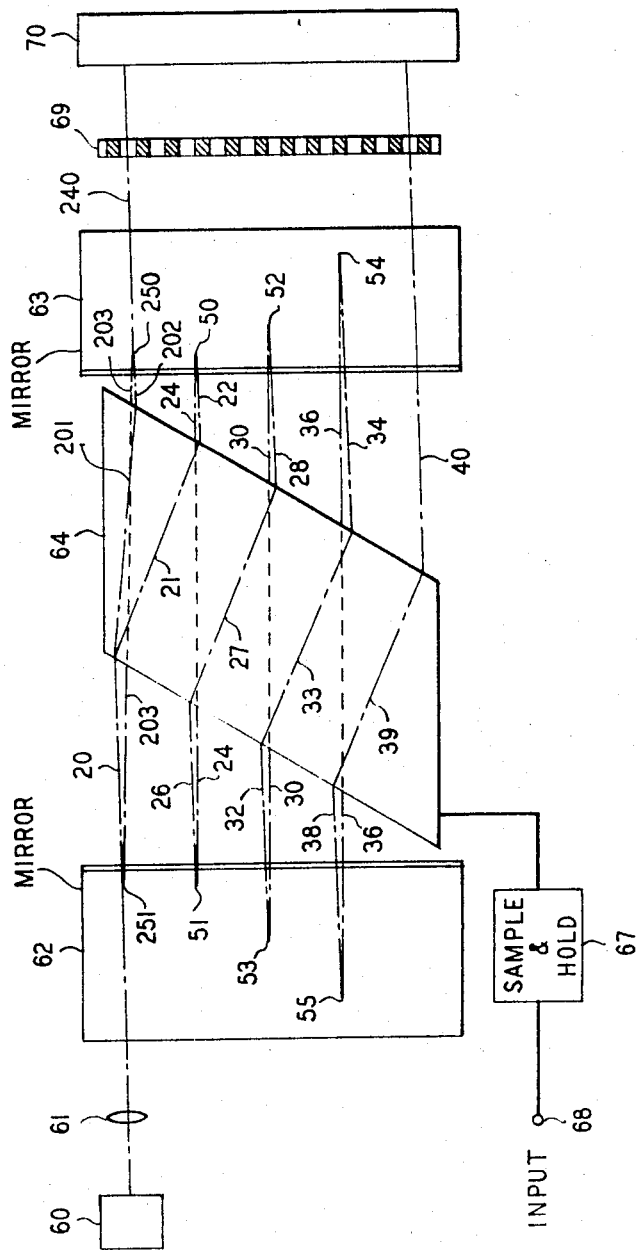
FIG. 2 is a top view of the light beam coder shown in FIG. 1.
Figure 3:
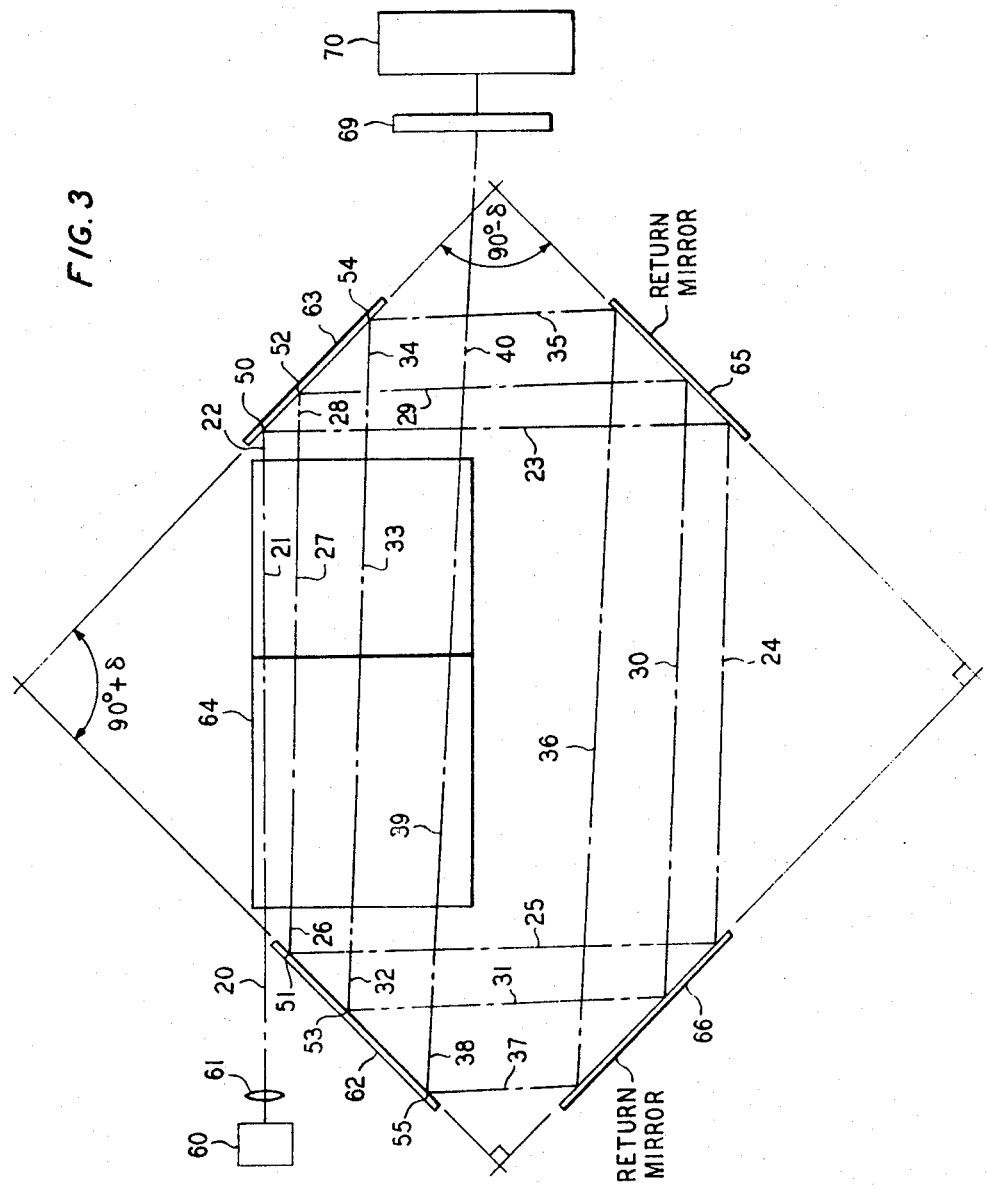
FIG. 3 is another front view of the light beam coder shown in FIG. 1.

A top view of the light beam coder embodiment of FIG. 1, particularly illustrating the refraction of the light beam through crystal 64, is shown in FIG. 2 and a front view thereof is shown in FIG. 3, the individual components being identified by like reference numbers in each figure. Planar mirrors 62 and 63 are positioned on opposite sides of electro-optic crystal 64 with the reflective surfaces of each mirror facing crystal 64. As shown in FIG. 3, planar mirrors 62 and 63 are oriented such that the angle between them is slightly greater than a right angle. As will be described below, this is necessary in the illustrative embodiment to provide "walk-off" of the light beam reflected between mirrors 62 and 63 after a predetermined number of passes through crystal 64. Planar return mirrors 65 and 66 are positioned as shown in FIG. 3, mirror 66 being positioned at a right angle to mirror 62 and mirror 65 being positioned at a right angle to mirror 66. The angle between mirrors 63 and 65 therefore is slightly less than a right angle.

Electro-optic crystal 64 is assumed for the purposes of description to be rhomboidal in shape and is positioned between mirrors 62 and 63 such that its upper face, shown in FIG. 2, extends above the upper edge of mirror 62 and its lower face extends below the lower edge of mirror 63. This permits the beam of light from source 60 to be directed through focusing lens 61 over the upper edge of mirror 62 to crystal 64. Alternatively, a transparent area or an aperture may be provided in mirror 62 through which the beam of light is directed to crystal 64. The analog signal to be encoded is applied at input terminal 68 to sample and hold circuit 67. Sample and hold circuit 67 thus provides an output signal which is applied to crystal 64, such as via strip lines disposed on crystal 64, creating an electric field which proportionally changes the index of refraction of crystal 64. Coding mask 69 is positioned such that it receives light beams passing from left to right through crystal 64 under the lower edge of mirror 63. Behind coding mask 69 is detector 70 which detects the presence of a light beam passing through coding mask 69.

In operation, light beam source 60 provides a beam of light through focusing lens 61 and over path 20 to the left face of crystal 64. The beam of light strikes crystal 64 at an oblique angle and is refracted through a particular incremental angle as it enters crystal 64. The magnitude of this incremental angle of refraction is controlled by the magnitude of the electric field applied to crystal 64 by sample and hold circuit 67, as mentioned above, and thus is proportional to the magnitude of the analog input signal at terminal 68. In the embodiment of FIGS. 1, 2 and 3, with no electric field applied from sample and hold circuit 67, that is, in the absence of an input signal at terminal 68, the light beam is refracted slightly over path 201 as it enters crystal 64. This is shown most clearly in FIG. 2. As the magnitude of the analog input signal at terminal 68 increases, the index of refraction of crystal 64 changes correspondingly such that the light beam is refracted in an increasingly forward direction through crystal 64. For example, assuming a particular input signal magnitude, the light beam is refracted over path 21 through crystal 64, as depicted in FIG. 2. For purposes of facilitating description of the invention, the refraction angles shown in FIG. 2 are greatly exaggerated; in practice the variation in the angle of refraction controlled by the electric field applied to crystal 64 is extremely small.

Assume then for the purposes of description that the electrical field applied to crystal 64 by the analog input signal sample held by circuit 67 is such that the light beam from source 60 is refracted over path 21 as it enters crystal 64. The beam is refracted again as it leaves crystal 64 and proceeds over path 22 to mirror 63, path 22 being parallel to path 20. The beam is reflected off mirror 63 at point 50 and is directed over path 23 to return mirror 65, as shown in FIG. 3. Return mirror 65 reflects the beam around crystal 64 via path 24 to return mirror 66, and thence over path 25 to mirror 62.

The light beam is next reflected off mirror 62 at point 51 and is directed over path 26 such that it passes through crystal 64 a second time. The output of sample and hold circuit 67 is held until the light beam exits from the system, and thus on the second pass through the crystal the light beam is refracted again through an angle identical to the angle of refraction on its first path 21. Consequently, the beam of light follows path 27 through crystal 64 and, upon being refracted leaving crystal 64, is directed over path 28 to point 52 on mirror 63.

It will be recalled that mirrors 62 and 63 are oriented such that they form an angle slightly greater than 90 degrees. Accordingly, point 52 is slightly lower than point 50 on mirror 63, as viewed from the front in FIG. 3. Thus, as a result of the orientation of mirror 62 and 63 the light beam tends to "walk" along mirror 63 toward the lower edge thereof with each passage through crystal 64.

After striking mirror 63 at point 52 the light beam is reflected over paths 29, 30, and 31 to point 53 on mirror 62. It is then reflected off mirror 62 a second time and passes via paths 32, 33 and 34 to point 54 on mirror 63, being refracted a third time as it passes through crystal 64. From FIG. 3 it will be noted that point 54 is lower on mirror 63 than point 52, the light beam continuing to "walk" toward the lower edge of mirror 63. From point 54 the light beam proceeds over paths 35, 36 and 37 to point 55 on mirror 62. Then it is reflected off mirror 62 and proceeds over paths 38 and 39. As with the previous three passes, it is refracted through the particular incremental angle determined by the held analog input signal sample.

As shown clearly in FIG. 3, after the fourth pass through crystal 64 the light beam, following path 40, is assumed to fall below the lower edge of mirror 63. After striking mirror 63 successively at points 50, 52 and 54, therefore, the light beam "walks off" mirror 63, and hence it is not reflected by mirror 63 after the fourth pass through crystal 64. Thus, the number of passes the light beam makes through crystal 64 is controlled solely by the orientation of the mirrors, and, no matter how large or small the angle of refraction through which the light beam is deflected by crystal 64 on each pass therethrough, it will traverse crystal 64 only the predetermined four times. Of course, it will be appreciated that by varying the orientation of mirrors 62, 63, 65 and 66, the light beam can be made to traverse crystal 64 any predetermined number of times before exiting to code mask 69 and detector 70.

In a well-known manner, the position of a light beam as it passes over path 40 is converted by code mask 69 and detector 70 into a digital representation of the magnitude of the input signal at terminal 68. For example, coding mask 69 could be designed to provide a multidigit Gray code representation of the input signal at terminal 68. In this case the light beam traveling over path 40 would be converted by conventional apparatus (not shown) into a vertical ribbon of light incident on coding mask 69. Individual detectors in detection circuit 70 would then detect the portions of the light ribbon passed by coding mask 69 and would provide a corresponding digital output on the basis thereof. Other arrangements for converting the position of a light beam traveling over path 40 into a digital representation are well known in the art.

For other values of the analog input signal at terminal 69, the light beam from source 60 is refracted through different angles by electro-optic crystal 64 and thus exits, after the predetermined number of passes through crystal 64, along different paths to coding mask 69. For example, in the absence of any signal at input terminal 68, as described above, light following path 20 from source 60 is refracted by crystal 64 over path 201. After leaving crystal 64 the light beam then follows path 202, is reflected off mirror 62 at point 250 and follows path 203 (via return mirrors 65 and 66) back to point 251 on mirror 62. There is no net displacement of the light beam on the first path through crystal 64, and, similarly, the following three passes also result in no net displacement along either of mirrors 62 or 63. It is understood, of course, that the light beam "walks off" the lower edge of mirror 63 in exactly the same manner as described above in detail. Thus, after the fourth pass through crystal 64 the light beam follows path 240 to coding mask 69, where its position is converted into a corresponding digital representation by detector 70.

It is noted that other arrangements for returning the beam of light from mirror 63 to mirror 62 after each pass through crystal 64 will be apparent to those skilled in the art. For example, a single return mirror may be used in place of return mirrors 65 and 66. Moreover, although a "walk-off gate" is used in the illustrative embodiment shown in FIGS. 1, 2 and 3, other methods of controlling the number of passes through crystal 64 may be employed in accordance with the principles of this invention. For example, a birefringent crystal may be positioned adjacent to electro-optic crystal 64, or crystal 64 may advantageously have both electro-optic and birefringent properties. By applying a gating pulse to the birefringent crystal at a predetermined time after the light beam enters the system, the light beam can be directed past one of the mirrors to coding mask 69 and detection circuitry 70.

If desired, the magnitude of the displacement of the light beam in response to a particular analog input signal magnitude can be further increased by positioning additional electro-optic crystals so as to intercept the light beam as it is reflected between other pairs of mirrors. Thus an additional electro-optic crystal may be disposed between mirrors 65 and 66 such that it intercepts the light beam over paths 24, 30 and 36 in FIG. 3. The same could be done between mirrors 63 and 65 for paths 23, 29 and 35 and between mirrors 66 and 62 for paths 25, 31 and 37.

Figure 4:
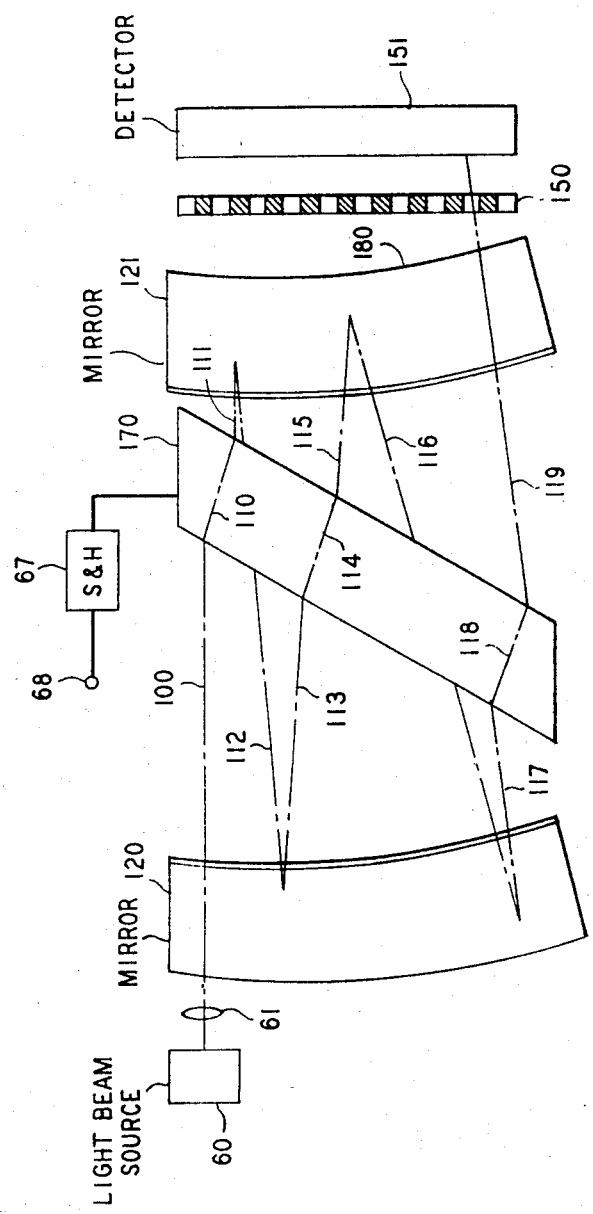
FIG. 4 shows an illustrative embodiment of a curved corridor light beam coder constructed in accordance with the invention.

Alternatively, FIG. 4 shows an illustrative light beam coder embodiment using curved mirrors 120 and 121 to increase the deflection of the light beam. Like FIG. 2, FIG. 4 is a view from above the light beam coder showing the deflection of the light beam due to refraction as it passes repeatedly through an electro-optic crystal 170. Similarly identified components in FIG. 4 are substantially identical to those shown in FIGS. 1, 2 and 3. Thus, light beam source 60 provides a beam of light through focusing lens 61; and an analog input signal applied at terminal 68 is directed to sample and hold circuit 67, which provides a corresponding electric field in electro-optic crystal 170.

Curved mirrors 120 and 121, one concave and the other convex, are oriented in a manner similar to mirrors 62 and 63 in the coder embodiment described above. The beam of light from source 60 enters crystal 170 over the upper edge of mirror 120 and finally exits below the lower edge of mirror 121 after a predetermined number of passes through crystal 170. Mirrors 120 and 121, however, unlike mirrors 62 and 63, are curved, mirror 120 being concave with respect to crystal 170 and mirror 121 being convex with respect to crystal 170. Beneath mirrors 120 and 121 and crystal 170 are return mirrors (not shown) which operate to return the light beam reflected from mirror 121 to mirror 120 around crystal 170 in a manner similar to that described above. It will be appreciated, thus, that a front view of the light beam coder in FIG. 4 appears substantially similar to the front view shown in FIG. 3 for the coder described above.

Electro-optic crystal 170 is assumed to be rhomboidal in shape like crystal 64 in the embodiment described above. Coding mask 150 and detector 151 are positioned relative to mirror 121 such that light beams passing beneath the lower edge 180 of mirror 121 are incident on coding mask 150 and are converted into appropriate corresponding digital signals by detector 151.

The operation of the embodiment of FIG. 4 is substantially similar to that of the embodiment of FIGS. 1, 2 and 3. Assume that, for a particular magnitude of analog input signal at terminal 68, the light beam from source 160 follows path 100 to the left face of crystal 170 and is refracted along path 110, the angle of refraction being determined of course by the analog signal magnitude. Upon leaving crystal 170 the light beam is refracted over path 111 to mirror 121 and is reflected downward to the return mirror or mirrors (not shown). By means of the return mirror or mirrors the light beam is reflected around crystal 170, such as over path 112, and is returned to mirror 120.

The light beam is then reflected over path 113 to crystal 170. It will be noted that path 113 is not parallel to path 100. This change in the direction of the light beam path is due to the curvature of mirrors 120 and 121 and, according to an aspect of my invention, advantageously results in additional horizontal displacement of the light beam. Thus the curvature of mirrors 120 and 121 in FIG. 4 increases the total deflection of the light beam passing through the coder significantly greater than that obtained by using planar mirrors. The displacement enhancement effect of the curvature of mirrors 120 and 121 is seen again, as the light beam, after following paths 113, 114 and 115 to mirror 121, is reflected from mirror 121 along path 116. Path 116, it will be noted, is not parallel to path 112, the path followed by the light beam after its first reflection from mirror 121.

After being reflected from mirror 120 a second time the light beam follows paths 117, 118 and 119 and "walks-off" the lower edge of mirror 121 to coding mask 150, passing through crystal 170 a total of three times. As described above, the position of the light beam as it falls beneath mirror 121 after the three passes through crystal 170 is converted by coding mask 150 and detector 151 into a digital representation corresponding to the sampled and held analog input signal magnitude from circuit 67.

A cascaded arrangement for accommodating higher analog input signal frequencies is shown in FIG. 5. Coders 501, 502, and 503, shown symbolically in FIG. 5, are assumed to be substantially identical and are coders of the variety described above. The analog input signal to be sampled is applied at terminal 400 which is connected to sample and hold circuit 401. The output of sample and hold circuit 401 is connected via lead 404 to the electro-optic crystal in coder 501. The output of sample and hold circuit 401 is also connected via delay circuit 402 and lead 405 to the electro-optic crystal in coder 502. The output of sample and hold circuit 401 through delay circuit 402 is connected further, via delay circuit 403 and lead 406, to the electro-optic crystal in coder 503. Delay circuits 402 and 403 are designed so as to provide a delay equal to the time required for a light beam to pass through coders 501 and 502, respectively, assumed herein to be identical. This, it will be recalled, is determined by the placement of the mirrors in each of these coders and by the number of times the light beam traverses the crystal in each coder. Light beam source 500 is positioned to direct a beam of light into coder 501, the light beam output from coder 501 being directed over path 510 to coder 502, and the output from coder 502 over path 511 to coder 503. Coding mask 410 and detector circuit 411 are positioned adjacent coder 503 so as to receive the light beam output therefrom.

In operation, an analog input signal at terminal 400 is sampled by circuit 401 and held for a period of time equal to the time required for a light beam from source 500 to pass through coder 501. Thus, as described above, the light is deflected by coder 501 through an angle determined by the magnitude of the signal on lead 404. After a predetermined number of reflections, the light beam leaves coder 501, illustratively along path 510, and is inputted to coder 502. Sample and hold circuit 401 is then free to obtain a new sample of the input signal at terminal 400 while the previous held input signal is provided by delay circuit 402 over lead 405 to coder 502, deflecting the light beam correspondingly through coder 502. Thus, as the light beam passes sequentially through coders 501 and 502, each of these coders is subject to the same input signal, at different times, on respective leads 404 and 405. Similarly, when the light beam leaves coder 502, delay circuit 403 provides the same held input signal on lead 406, and the light beam deflected through coder 503 according to that input signal. Finally, the light beam leaves coder 503, illustratively via path 512, and coding mask 410 and detector circuit 411 convert the position, that is, the total light beam deflection, into a corresponding digital representation.

It will be appreciated that the cascade arrangement shown in FIG. 5 could be replaced by a single coder, provided the light beam was transmitted through the electro-optic crystal enough times such that an equivalent total deflection is achieved. The sampling frequency and hence the permissible input frequency accommodated by such a system would be limited, however, since the input signal would necessarily have to be held until the light beam exited from the single coder. On the other hand, by using a cascade arrangement as shown in FIG. 5, the input signal is advantageously held only until the light beam has left the first coder, and accordingly the sample and hold circuit may operate at a considerably greater frequency, depending upon the number of coders cascaded.

Although the light deflection apparatus has been illustratively disclosed herein as a coder, it will be readily apparent that it may be employed advantageously as a multiplexing device. For example, a staircase signal may be applied to the electro-optic crystal, causing the light beam to be deflected repeatedly in sequence to a finite number of positions. If a communication channel is positioned to coincide with each of these positions, the multiplex signal can be diverted by the electro-optic crystal to the appropriate channel.

What I claim is:

1. In combination, a source of a beam of light, a source of input signals, means including electro-optic material for deflecting said beam of light through a variable angle determined by the magnitude of a signal from said source of input signals, said electro-optic material having at least one light input surface and means including first, second and third reflector means for directing said beam of light to only said one light input surface of said electro-optic material a predetermined number of times, whereby said variable angle of deflection of said beam of light is multiplied by said predetermined number.

2. The combination according to claim 1 wherein said electro-optic material exhibits a variable index of refraction determined by the magnitude of signals applied thereto and said deflecting means comprises means for applying signals from said source of input signals to said electro-optic material.

3. The combination according to claim 2 wherein said first and second reflector means are positioned in a facing spaced-apart relationship with said electro-optic material disposed therebetween.

4. The combination according to claim 3 wherein said directing means further includes means for initially directing said beam of light througn said electro-optic material to said first reflector means, and wherein said third reflector means comprises means for directing said beam of light from said first reflector means to said second reflector means without passing through said electro-optic material.

5. The combination according to claim 4 wherein said first and second reflector means and said electro-optic material are positioned relative to each other such that when said beam of light is incident on said second reflector means it is reflected through said electro-optic material at least $n$ times where $n+1$ is equal to said predetermined number of times.

6. The combination according to claim 5 further comprising output means responsive to the magnitude of deflection of said beam of light after said beam of light is directed to said deflecting means said predetermined number of times.

7. The combination according to claim 5 wherein said first and second reflector means comprise individual planar mirrors.

8. In combination, a source of a beam of light, a source of input signals, means for deflecting said beam of light through a variable angle determined by the magnitude of signals from said source of input signals, said deflecting means including electro-optic material, and means including first and second curved reflectors, one concave and the other convex, for directing said beam of light through said electro-optic material a predetermined number of times.

9. The combination according to claim 8 further comprising output means responsive to the magnitude of deflection of said beam of light after said beam of light exits from said electro-optic material after being directed therethrough said predetermined number of times.

10. The combination according to claim 9 wherein said directing means directs said beam of light through said electro-optic material in a first direction from one of said first and second reflectors to the other of said reflectors and includes means for returning said beam of light from said other reflector to said one reflector without passing through said electro-optic material.

11. In combination; first and second light beam deflection means each comprising electro-optic material for deflecting a beam of light through a variable angle determined by the magnitude of signals applied thereto, and means including a pair of reflectors for directing said beam of light through said electro-optic material a predetermined number of times; a source of a beam of light; means for cascading said first and second light beam deflection means such that said beam of light from said source is directed to said first deflection means and after being directed through said electro-optic material thereof said predetermined number of times is directed to said second deflection means; a source of input signals; and means for applying said input signals to said first deflection means and after a predetermined delay applying said input signals to said second deflection means.

12. The combination according to claim 11 wherein said predetermined delay is substantially the same as the time required for directing said beam of light said predetermined number of times through the electro-optic material of said first light beam deflection means.